US009338781B2

(12) United States Patent
Nguyen et al.

(10) Patent No.: US 9,338,781 B2
(45) Date of Patent: May 10, 2016

(54) ADDITIONAL CARRIER TYPES FOR LTE

(75) Inventors: Phong Nguyen, Victoria (AU); Satha Sathananthan, Victoria (AU)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 14/346,379

(22) PCT Filed: Sep. 5, 2012

(86) PCT No.: PCT/JP2012/073247
§ 371 (c)(1),
(2), (4) Date: Mar. 21, 2014

(87) PCT Pub. No.: WO2013/047191
PCT Pub. Date: Apr. 4, 2013

(65) Prior Publication Data
US 2014/0226610 A1  Aug. 14, 2014

(30) Foreign Application Priority Data

Sep. 27, 2011 (JP) ................................. 2011-211585

(51) Int. Cl.
*H04Q 7/00* (2006.01)
*H04W 72/04* (2009.01)
*H04L 5/00* (2006.01)

(52) U.S. Cl.
CPC ........... *H04W 72/0453* (2013.01); *H04L 5/001* (2013.01); *H04L 5/005* (2013.01); *H04L 5/0053* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 2010/0227569 A1* | 9/2010 | Bala | H04L 5/0007 455/73 |
| 2011/0081913 A1 | 4/2011 | Lee et al. | |
| 2013/0039284 A1* | 2/2013 | Marinier | H04L 5/001 370/329 |
| 2013/0044727 A1* | 2/2013 | Nory | H04L 5/0092 370/330 |
| 2013/0176952 A1* | 7/2013 | Shin | H04L 5/001 370/329 |
| 2013/0188505 A1* | 7/2013 | Nory | H04L 5/0053 370/252 |

FOREIGN PATENT DOCUMENTS

WO  WO 2011/041338  4/2011

OTHER PUBLICATIONS

International Search Report corresponding to PCT/JP2012/073247, dated Oct. 9, 2012; 1 page.
Written Opinion corresponding to PCT/JP2012/073247, mailing date Oct. 9, 2012; 3 pages.
Nokia Corporation, Nokia Siemens Networks, RP-110732, "LTE Carrier Aggregation Enhancements", RAN#52, May 31-Jun. 3, 2011.
3GPP TSG-RAN WG1, R1-100828; "LS on Additional Carrier Types for LTE-A", Ran1, Valencia, Spain, Jan. 18-22, 2010, 2 pages.
3GPP TSG-RAN WG4, R4-100977, "Reply LS on additional Carrier Types for LTE-A", RAN4; San Francisco, Feb. 22-26, 2010; 1 page.

(Continued)

*Primary Examiner* — Duc C Ho
(74) *Attorney, Agent, or Firm* — Wilmer Cutler Pickering Hale and Dorr LLP

(57) ABSTRACT

A method for transmitting and receiving a carrier segment in a wireless communications system, including a base station and a user equipment, is disclosed. The carrier segment includes a first band having a first bandwidth and a second band having a second bandwidth, wherein a first segment gap is disposed in a frequency domain between the first band and the second band.

16 Claims, 10 Drawing Sheets

(56) References Cited

OTHER PUBLICATIONS

NEC Group, R1-112129, "Views on Extension Carrier and Carrier Segments", Athens Greece; Aug. 22-26, 2011;3 pages.

Ericsson, ST-Ericsson, R1-112081, "Considerations on Use Cases for Additional Carrier Types Erricsson, ST-Ericsson" Aug. 22-26, 2010; 3 pages.

Alcatel-Lucent, Alcatel-Lucent Shanghai Bell, R1-112409, "Discussions on Additional Carrier Types in LTE Rel-11"; Athens, Greece, Aug. 22-26, 2011; 3 pages.

NTT Docomo, R1-112428, "On the Need for Additional Carrier Types in Rel-11 CA", Athens, Greece, Aug. 22-26, 2011; 4 pages.

ZTE, R1-112248, "Introduction of Additional Carrier Types", Athens, Greece, Aug. 22-26, 2011; 4 pages.

3GPP TSG-RAN WG1, R1-100828; "LS on Additional Carrier Types for LTE-A", Ran4, Valencia, Spain, Jan. 18-22, 2010, 2 pages.

Huawei, HiSilicon, R1-112463, "Additional Carrier Types-Motivations and Issues", Athens, Greece, Aug. 22-26, 2011; 5 pages.

3GPP TS 36.104:"Evolved Universal Terrestrial Radio Access (E-UTRA); Base Station (BS) Radio Transmission and Reception", Release 10, V10.3.0, pp. 1-104, Jun. 2011.

3GPP TS 36.101:"Evolved Universal Terrestrial Radio Access (E-UTRA); User Equipment (UE) Radio Transmission and Reception", Release 10, V10.3.0; pp. 1-238, Jun. 2011.

3GPP TS 36.331: "3rd Generation Partnership Project; Technical Specification Group Radio Access Network; Evolved Universal Terrestrial Radio Access (E-UTRA); Radio Resource Control (RRC); Protocol Specification" Release 10; V10.2.0; pp. 1-295, Jun. 2011.

3GPP TS 36.133 V10.2.0; "3rd Generation Partnership Project; Technical Specification Group Radio Access Network; Evolved Universal Terrestrial Radio Access (E-UTRA); Requirements for Support of Radio Resource Management" (Release 10); pp. 1-418, Apr. 2011.

\* cited by examiner

ADDITIONAL CARRIER TYPES FOR LTE

CROSS-REFERENCE TO RELATED APPLICATIONS

This application is a national stage application of International Application No. PCT/JP2012/073247 entitled "Additional Carrier Types for LTE," filed on Sep. 5, 2012, which claims the benefit of the priority of Japanese Patent Application No. 2011-211585, filed on Sep. 27, 2011, the disclosures of each of which are hereby incorporated by reference in their entirety.

TECHNICAL FIELD

The invention provides framework and the associated signaling mechanism to define additional carrier type, known as "carrier segments", which is non-backward compatible carrier.

BACKGROUND ART

A new work item, "LTE Carrier Aggregation Enhancements", was agreed in RAN plenary meeting (RAN#52, May 31 to Jun. 3, 2011) for Rel-11 LTE. One of the main objectives of this work item is to study additional carrier types including non-backwards compatible elements for carrier aggregation, considering their deployment scenarios, benefits, drawbacks and standardization impacts. The additional carrier types were also briefly considered during Rel-10 LTE work (see reference [2] below). The following two additional carrier types were considered:
  Extension Carrier
  Carrier segment As shown in FIG. 1A, the carrier segment has a backward compatible carrier (stand alone carrier) and one or two carrier segment(s) located at back side only or front and back sides of the backward compatible carrier. The extension carrier has, as shown in FIG. 1B, a backward compatible carrier (primary component carrier) and a extension carrier (secondly component carrier) located thereafter.

However, these additional carrier types were not further considered for Rel-10 LTE mainly due to anticipated work load in 3GPP RAN work groups and available time left for Rel-10 LTE completion (see reference [3] below). Many company contributions in last RAN1 meeting (RAN1#66, Aug. 22 26, 2011) discussed the benefits of additional carrier types, and proposed to be standardized in Rel-11 LTE (see references [4]-[8] below). The key motivations for additional carrier types are:
  Flexible and efficient spectrum usage so as to:
  Utilize available spectrum for legacy UE operation, while introducing new bandwidths and features for new UE operation; and
  Optimize time and frequency resources (i.e., resources elements) for data transmission, while reducing the over head for control and reference signal.
  Interference coordination and management so as to
  Migrate from cell specific transmission in Rel-8/9 to UE specific transmission from Rel-10 onwards, which is more efficient form interference coordination point of view in heterogeneous network deployment scenario.
  Energy saving so as to:
  Move from cell specific transmission to UE specific transmission to avoid transmission unnecessary control and reference signals; and
  perform Demand based transmission.

"Extension Carriers" and "Carrier Segments" would be characterized by reference [2] as:
  No PBCH/Release-8 SIB/Paging
  No PSS/SSS
  No PDCCH/PHICH/PCFICH
  No CRS
  Rel-10 mobility is based on measurements in backwards compatible CC(s)

An extension carrier must be a part of a component carrier set where at least one of the carriers in the set is a backwards compatible component carrier. A carrier segment is defined as contiguous bandwidth extension of a backwards compatible component carrier. Moreover, carrier segments would have single HARQ for the combined bandwidth with single PDCCH for resources allocations (see reference [2]).

In fact, one could consider "Extension Carrier" as a sub-set of "Carrier Segment" where bandwidth of the backward compatible part of the carrier is zero. Thus, "Extension Carrier" always needs to be attached with primary component carrier (PCC) for synchronization and mobility mechanisms. To simplify the discussion, we call additional carrier type with "Carrier segment" as "semi-backward compatible carrier (SBCC)". Note that SBCC can operate either as standalone carrier or as one component carrier in the carrier aggregation scenario.

REFERENCES

[1] RP-110732, "LTE Carrier Aggregation Enhancements", RAN#52.
[2] R1-100828, "LS on additional carrier types for LTE-A", RAN1.
[3] R4-100977, "Reply LS on additional carrier types for LTE-A", RAN4.
[4] R1-112129, "Views on Extension carrier and Carrier segments", NEC
[5] R1-112081 Considerations on use cases for introduction of additional carrier types Ericsson, ST-Ericsson
[6] R1-112409 Discussions on Additional Carrier Types in LTE Rel 11 Alcatel-Lucent, Alcatel-Lucent Shanghai Bell
[7] R1-112428 On need of additional carrier type in Rel-11 CA NTT DOCOMO
[8] R1-112463 Additional carrier types motivations and issues Huawei, HiSilicon
[9] 3GPP TS 36.104: "Evolved Universal Terrestrial Radio Access (E-UTRA); Base Station (BS) radio transmission and reception", Release 10, V10.3.0.
[10] 3GPP TS 36.101: "Evolved Universal Terrestrial Radio Access (E-UTRA); User Equipment (UE) radio transmission and reception", Release 10, V10.3.0.
[11] 3GPP TS 36.331: "Requirements for support of radio resource management", Release 10, V10.2.0.

DISCLOSURE OF INVENTION

According to an exemplary embodiment of the present invention, a method implemented in a base station used in a wireless communications system comprises transmitting a carrier segment to a user equipment, wherein the carrier segment comprises: a first band having a first bandwidth; and a second band having a second bandwidth, wherein a first segment gap is disposed in a frequency domain between the first band and the second band.

In the method as described above, the carrier segment may further comprise a third band having a third bandwidth, wherein a second segment gap may be disposed in the frequency domain between the first band and the third band.

In the method as described above, the third bandwidth may be equal to the second bandwidth.

In the method as described above, the first bandwidth may be greater than 1.4 MHz.

In the method as described above, the first bandwidth may be either one of 1.4, 3, 5, 10, 15, or 20 MHz.

In the method described above, the second band may comprise one or more UE-specific channels.

In the method as described above, the first band may include a physical downlink common control channel (PDCCH).

In the method as described above, wherein the PDCCH comprises an enhanced physical downlink common control channel (EPDCCH).

In the method as described above, the carrier segment may be used as a component carrier for carrier aggregation.

In the method as described above, the component carrier may be a primary carrier.

In the method as described above, the component carrier may be a secondary carrier.

In the method as described above, the first band may include a cell-specific reference signal (CRS).

In the method as described above, a signaling message for the carrier segment may comprise: at least one of a master information block and a system information block; and additional signaling information for the carrier segment.

In the method as described above, the additional signaling information may be equal to or less than 4 bits.

Further, according to another exemplary embodiment of the present invention, a method implemented in a user equipment used in a wireless communications system comprises: receiving a carrier segment from a base station, wherein the carrier segment comprises: a first band having a first bandwidth; and a second band having a second bandwidth, wherein a first segment gap is disposed in a frequency domain between the first band and the second band.

A wireless communications system according to an exemplary embodiment of the present invention comprises: transmitting a carrier segment from a base station to a user equipment, wherein the carrier segment comprises: a first band having a first bandwidth; and a second band having a second bandwidth, wherein a first segment gap is disposed in a frequency domain between the first band and the second band.

EMBODIMENTS FOR CARRYING OUT THE INVENTION

Exemplary embodiments of the present invention will be described hereinafter with reference to the drawings.

Exemplary embodiments of the present invention introduce a framework, called "semi-backward compatible carrier (SBCC)". The framework defines:

The bandwidth of the 'backward compatible part' equal to one of the Rel-8/9/10 LTE bandwidths (1.4, 3, 5, 10, 15 and 20 MHz).

The bandwidth of the 'non-backward compatible part' equal to one of the Rel-8/9/10 LTE bandwidths (3, 5, 10, 15 and 20 MHz) but larger than 1.4 MHz.

It does not preclude other bandwidth larger than 1.4 MHz.

The 'non-backward compatible part' is divided into two equal segments and they are adjacent and contiguous to 'backward compatible part'.

The framework defines 4 bits in the broadcast message to notify SBCC bandwidth (say bandwidth_dl_rel-11) to Rel-11 and later release UEs. Existing spare bits in the broadcast message could be used for this purpose. The following "information block" on broadcast messages could be considered for the addition of these 4 bits.

MIB (Master Information Block)

SIB (System Information Block)

Signaling mechanism for resources allocations in the non-backward compatible part of SBCC could be one or both of the following method:

Use PDCCH with SBCC bandwidth.

PDCCH corresponds to backward compatible bandwidth (bandwidth_dl) to allocate resources in backward compatible bandwidth part.

PDCCH corresponds to SBCC (bandwidth_dl_rel-11) to allocate resources in non-backward compatible bandwidth part.

Use E-PDCCH (Enhanced PDCCH) to be defined in Rel-11 LTE.

This exemplary embodiment of the invention introduces the framework of "Semi-backward compatible carrier (SBCC)" and "SBCC bandwidth (BWSBCC)" to Rel-11 and later releases LTE by providing additional carrier types and to define new bandwidth for LTE in a backward compatible manner.

Figure 1A:
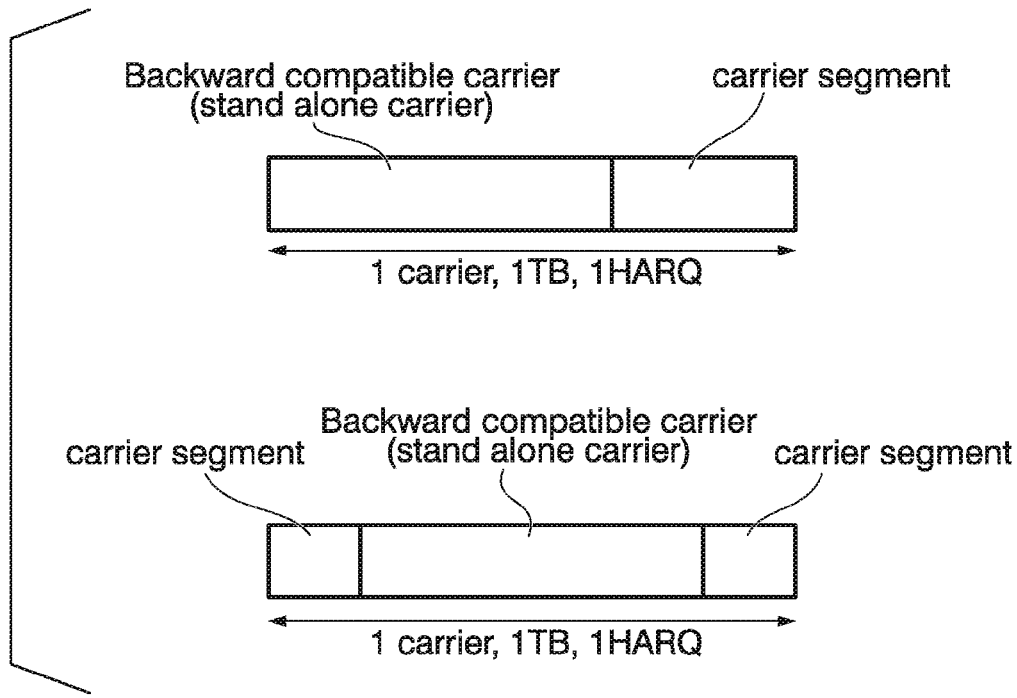
FIGS. 1A and 1B are diagrams showing additional carrier type.
Figure 1B:
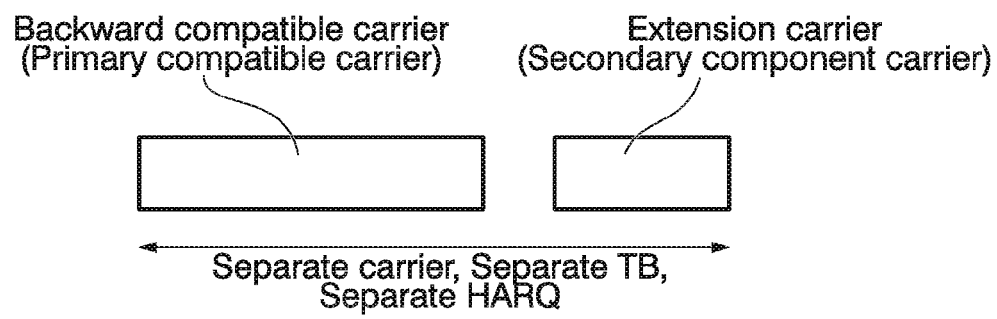
Figure 2:
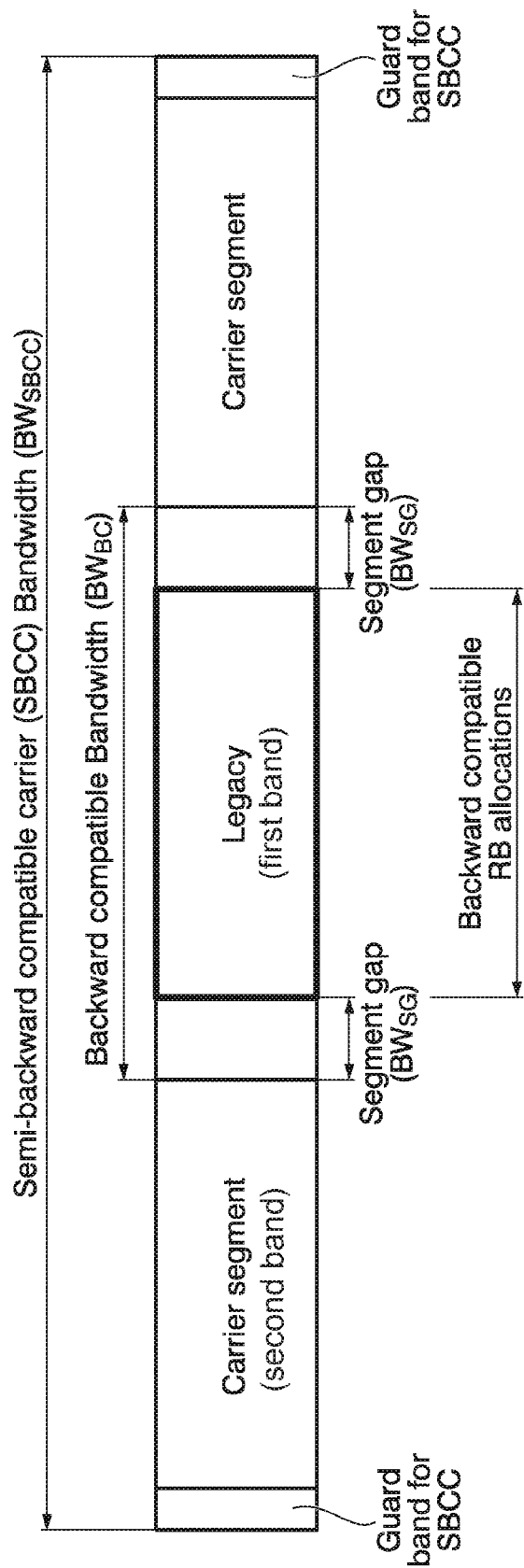
FIG. 2 is a diagram showing definition of "Semi-backward compatible carrier".

This concept is shown in FIG. 2.

SBCC is defined as a LTE carrier including:

'backward compatible bandwidth (BWBC)' which is equal to one of LTE bandwidth 1.4, 3, 5, 10, 15 and 20 MHz defined in Rel-8/9/10 and similar physical channel and signal mappings as that of Rel-8/9/10 LTE.

and 'two equal carrier segments' contiguous to both sides of backward compatible bandwidth. The total bandwidth of carrier segments is called non-backward compatible bandwidth (BWNBC) which shall contain only UE specific control and data channels.

SBCC bandwidth is defined as the bandwidth of SBCC carrier which is greater than 1.4 MHz, and could be either:

equal to one of LTE bandwidth 3, 5, 10, 15 and 20 MHz defined in Rel-8/9/10, or newly created bandwidth to be defined in Rel-11 and later release.

To minimize implementation complexity and making smooth migration from cell specific transmission in Rel-8/9/

Figure 3:
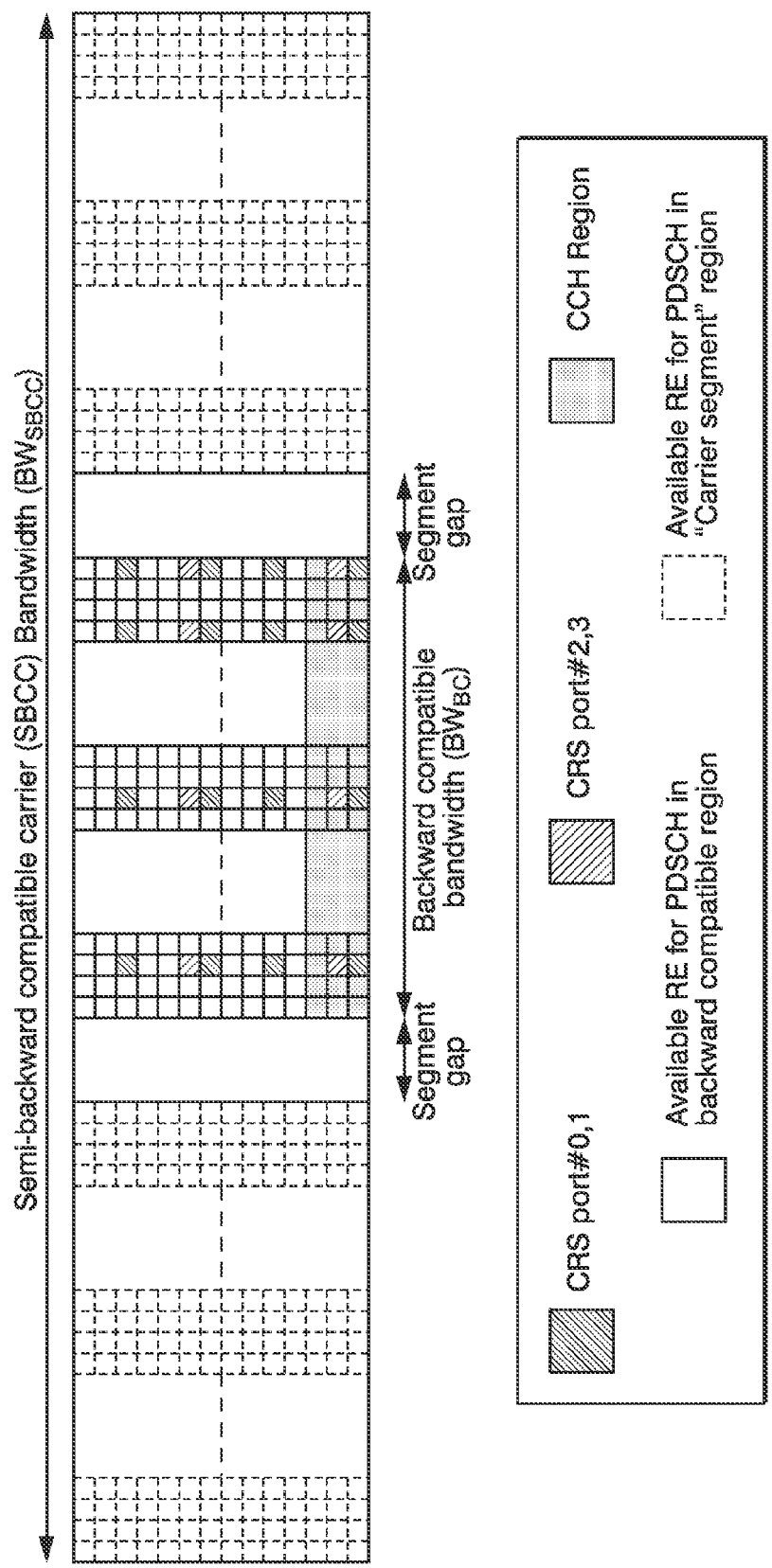
FIG. 3 is a diagram showing DL resources grid in the "Semi-backward compatible carrier".

10 to UE specific transmission from Rel-10 onwards, the resources grids are defined as shown in FIG. 3.

In the non-backward compatible part of the bandwidth,
  Only UE specific control and UE specific data channel could be present, and
  No PBCH/Rel-8 SIB/Paging, PSS/SSS, CRS and PCFICH/PDCCH/PHICH control signaling could be present.
In the backward compatible part of the bandwidth,
  Same as legacy Rel-8/9/10 LTE To minimize standardization complexity and impacts in introducing additional carrier type, the framework is used in two phase.

In the first phase, the SBCC bandwidth and its compatible bandwidth are part of Rel-8/9/10 bandwidth. This avoids the need to develop new RF requirements for base station and UE including regulatory requirements. This simplifies standardization, and implementation complexities.

In the second phase, new bandwidth can be introduced for SBCC in Rel-11 or later release. This requires the need to develop new RF requirements for base station and UE including regulatory requirements. Moreover, "segment gap" could be optimized to improve spectral efficiency.

Figure 4:
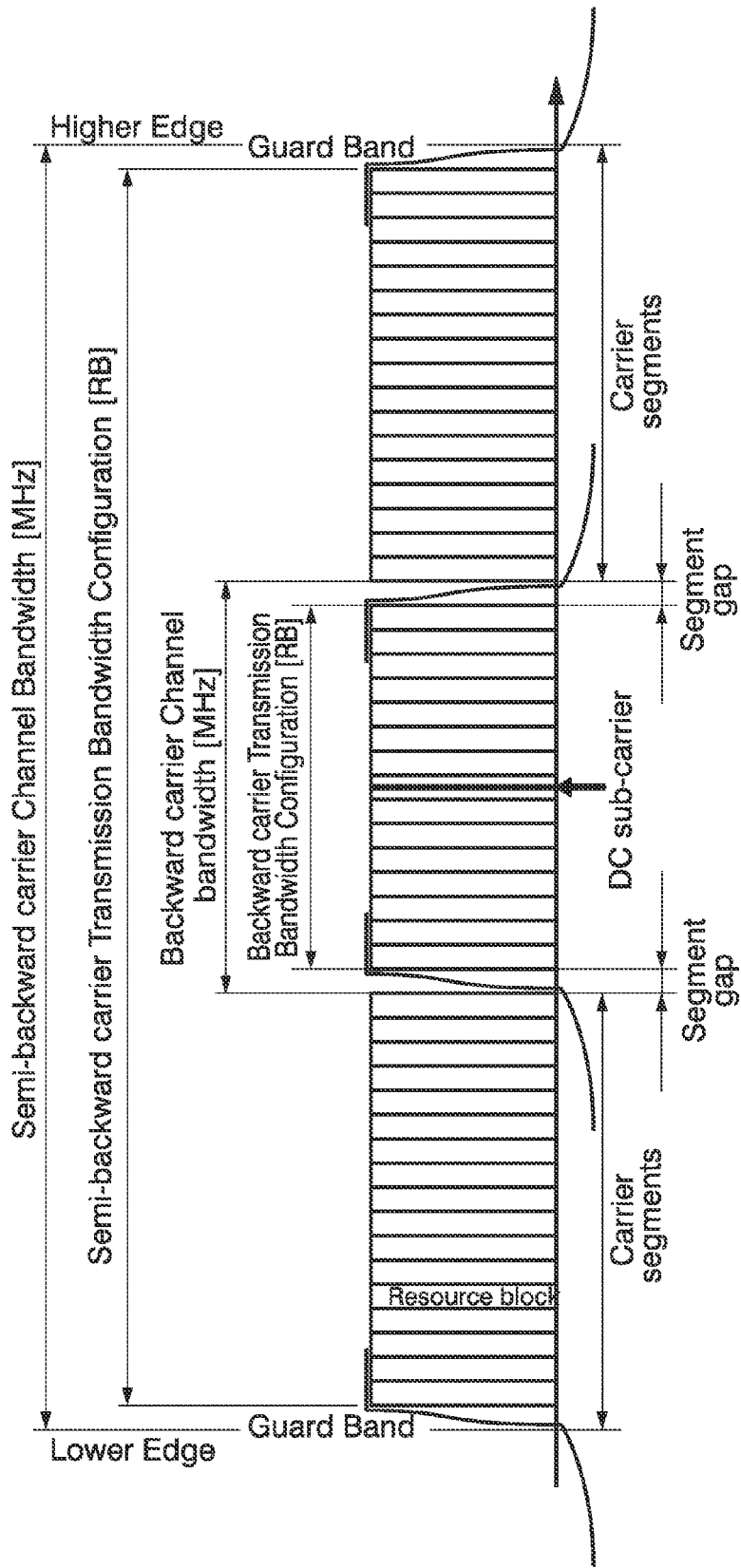
FIG. 4 is a diagram showing framework for standardization of the "Semi-backward compatible carrier".

FIG. 4 illustrates the definitions of SBCC to align with the RF requirements. The base station and UE RF requirements along with bandwidth definitions are specified in TS36.104 (reference [9]) and TS36.101 (reference [10]), respectively. More specifically, the framework provides following features in terms of RF requirements.

Transmitter requirements for base station and UE:
  All transmit RF requirements are only limited by SBCC bandwidth.
Receiver requirements for base station and UE:
  Receive RF requirement, reference sensitivity (REF SENS) could be influenced by "Segment gap". The default "segment gap" is applicable if backward compatible bandwidth and SBCC bandwidth are part of Rel-8/9/10 bandwidth. It might be possible to optimize the "segment gap" apart from default value.

To avoid performance impacts to legacy Rel-8/9/10 UEs on the backward compatible bandwidth, a proper segment gap needs to be used, where there is no transmission takes place (FIG. 3). Note that the segment gap is only needed if there is need to support legacy Rel-8/9/10 UEs. Therefore, the scheduler function could handle whether segment gap is to be maintained or not based on deployment scenario.

Figure 5:
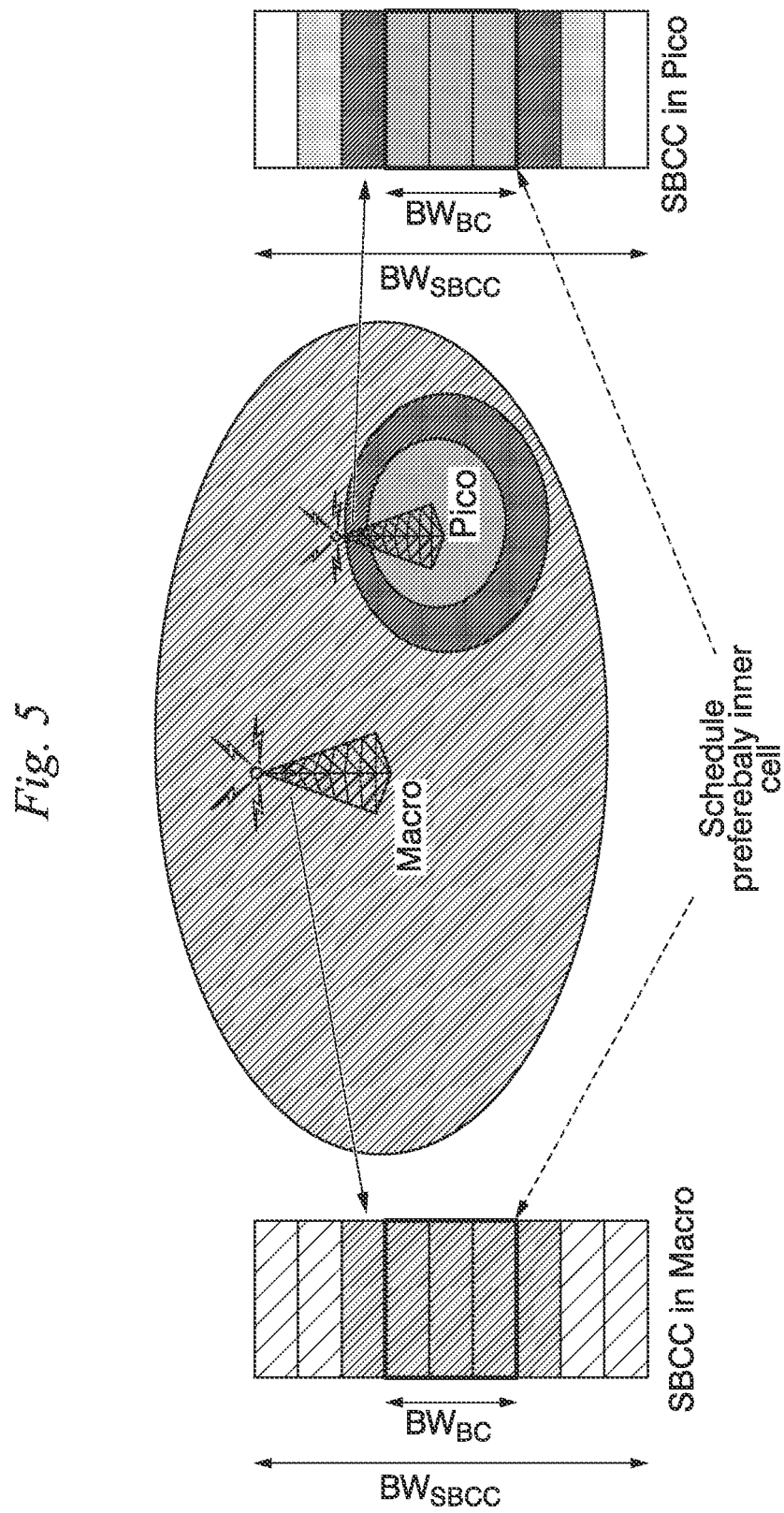
FIG. 5 is a schematic view showing HetNet deployment scenarios for the "Semi-backward compatible carrier".
Figure 6A:
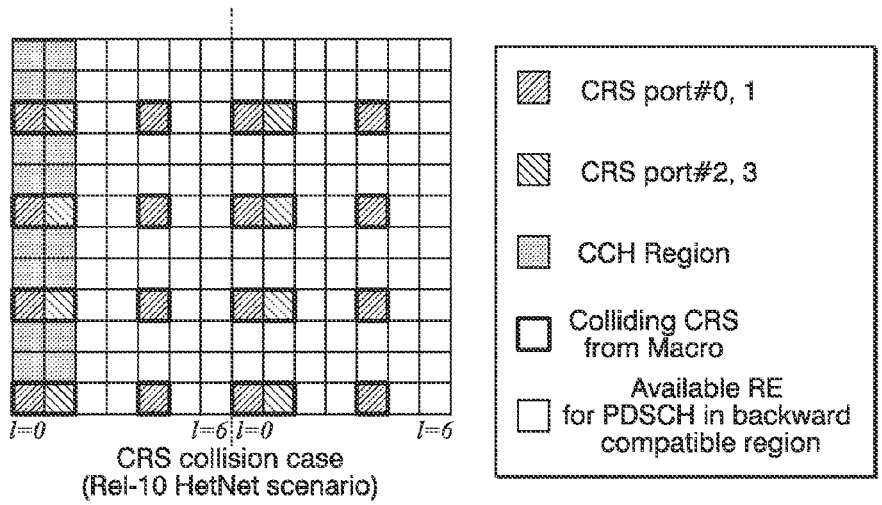
FIGS. 6A, 6B and 6C are diagrams showing HetNet interference coordination with the "Semi-backward compatible carrier".
Figure 6B:
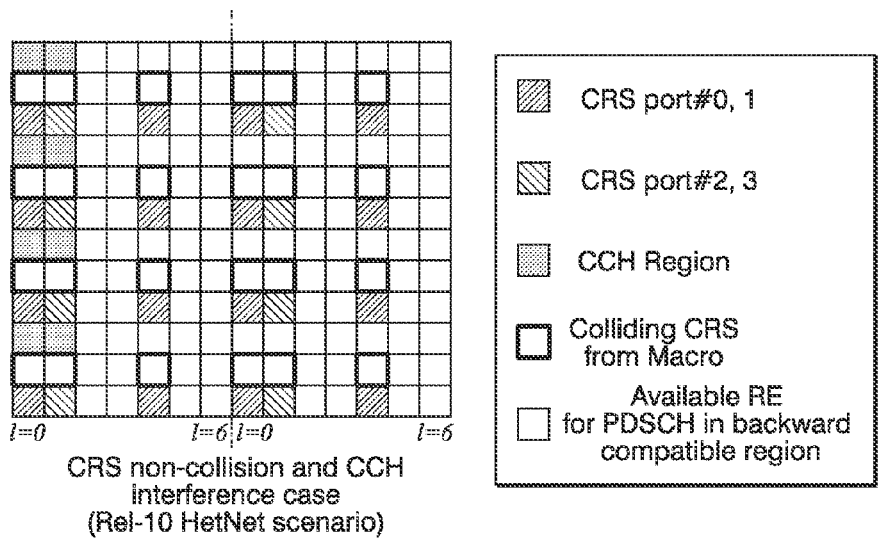
Figure 6C:
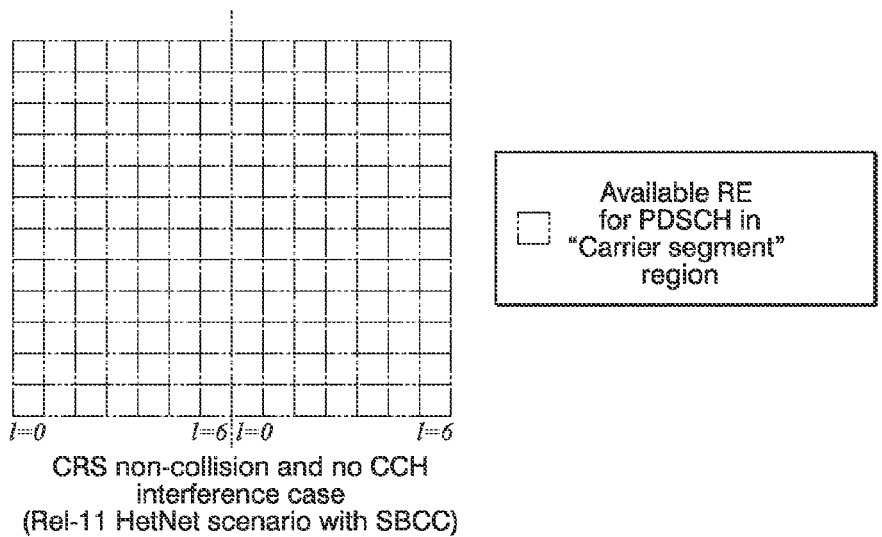

It is highly beneficial to use SBCC in heterogeneous network deployment scenarios to coordinate and manage interference efficiently. As shown in FIG. 5, the centre part of the bandwidth could be used to schedule macro inner cell UEs and pico inner cell UEs. Where the UEs in the cell range expansion (CRE) region shall be allocated with the 'non-backward compatible part of SBCC'. This would reduce interference in UEs in the CRE region. This is shown in FIGS. 6A, 6B and 6C where CRS collision and control channel interference are not issue. This enables to use large CRE bias to improve system capacity.

As shown in FIG. 6C, the SBCC provides opportunity for energy saving by not transmitting control and reference signal in cell specific manner.

Figure 7:
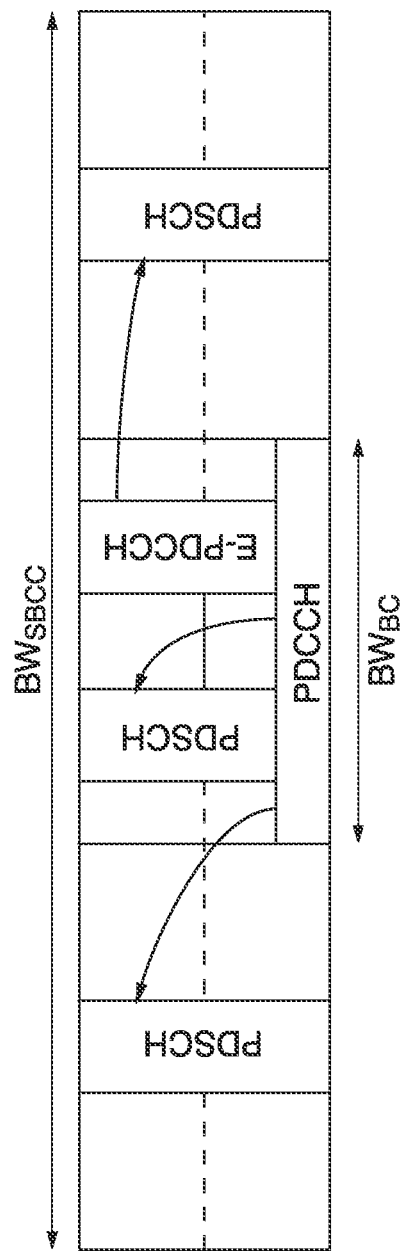
FIG. 7 is a diagram showing DL Resources allocation in the "Semi-backward compatible carrier".

Signaling mechanism for resources allocations in the non-backward compatible part of SBCC could be one or both of the following method as shown in FIG. 7:

Use PDCCH with SBCC bandwidth.

PDCCH corresponds to backward compatible bandwidth (dl-Bandwidth) to allocate resources in backward compatible bandwidth part.

PDCCH corresponds to SBCC (dl-Bandwidth_Re-11) to allocate resources in non-backward compatible bandwidth part.

Use E-PDCCH to be defined in Rel-11 LTE.

Figure 8:
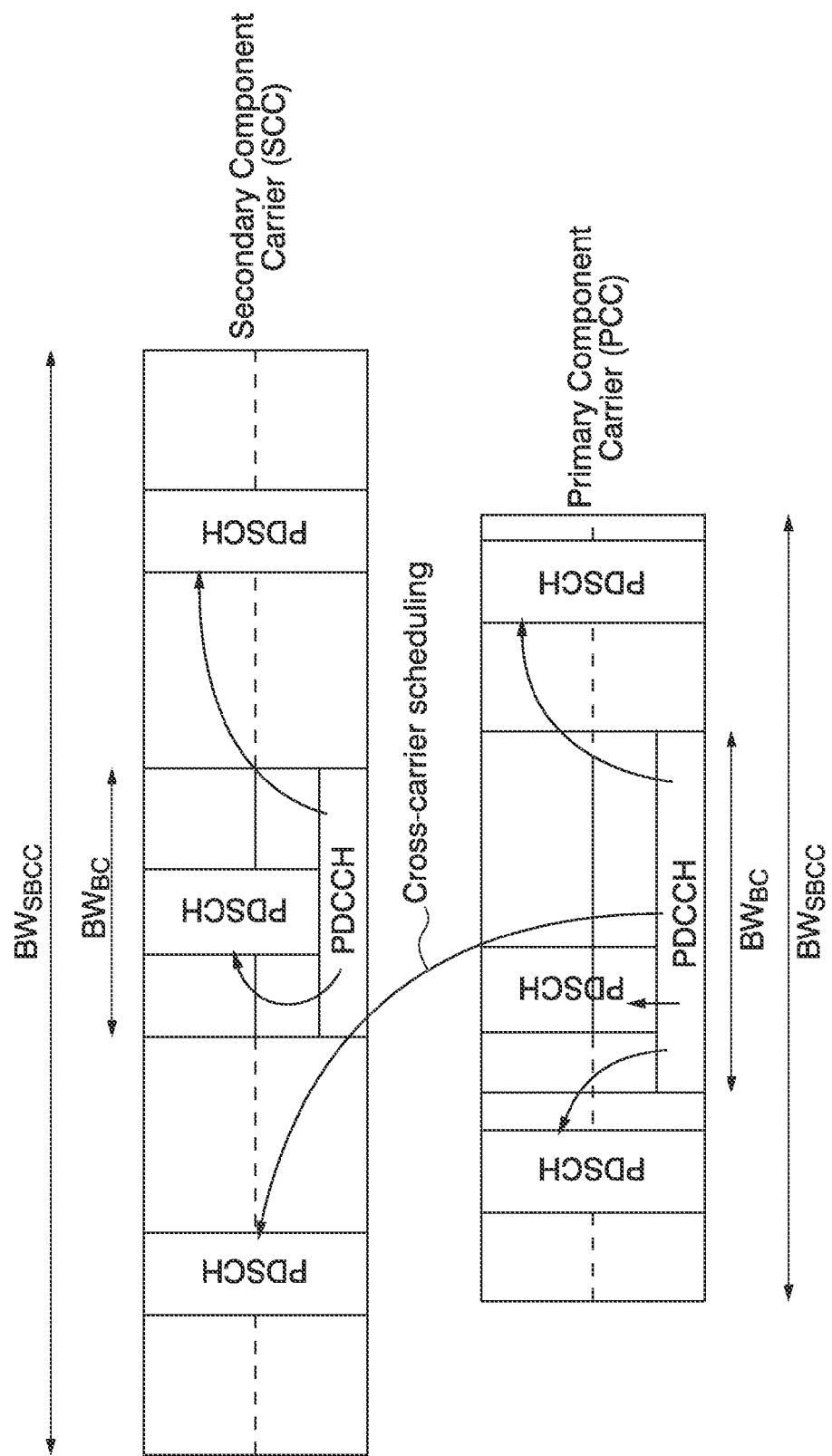
FIG. 8 is a diagram showing the "Semi-backward compatible carrier" as component carrier in carrier aggregation scenario.

As shown in FIG. 8, the SBCC could be used as component carrier (either as a primary or secondary) in carrier aggregation scenario.

Since SBCC always contains CRS in the backward compatible region, there is no additional signaling mechanism needed for synchronizations and measurements if SBCC is configured as secondary component carrier. This offers significant advantage when component carriers are in different band.

Figure 9:
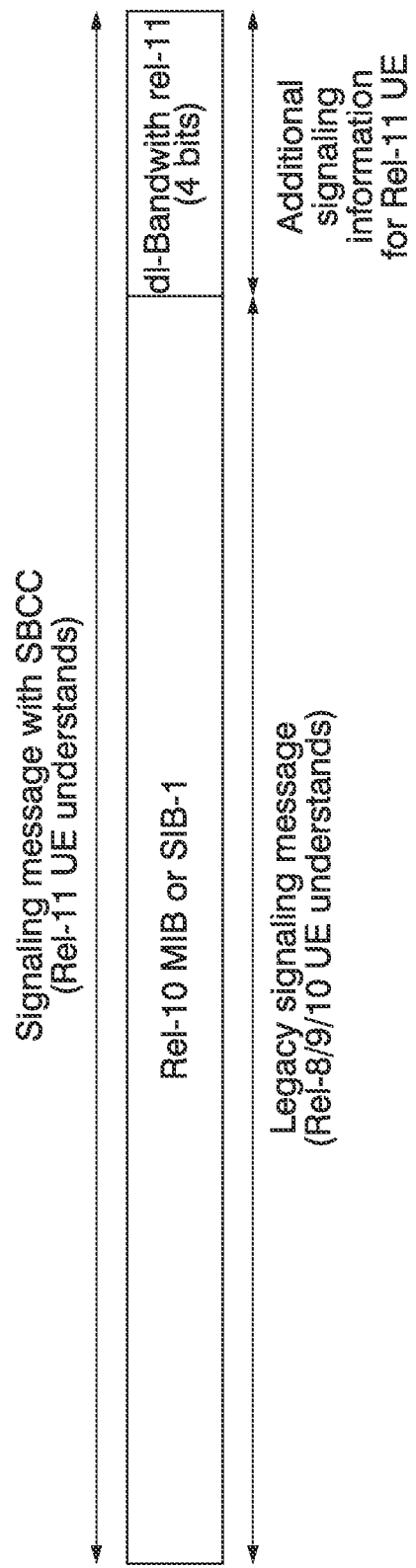
FIG. 9 is a diagram showing a signaling mechanism for bandwidth notification of the "Semi-backward compatible carrier".

The concept of signaling mechanism for bandwidth notification of "Semi-backward compatible carrier" is shown in FIG. 9. Broadcast message could be used to notify SBCC bandwidth (say dl-Bandwidth_Re-11) to Rel-11 and later release UEs. Either Master Information Block (MIB) or System Information Block (SIB) broadcast message with existing spare bits could be used for this purpose. 4 bits could be enough to define this SBCC bandwidth.

The following shows how the existing specification could be modified for this purpose.

Modification of MIB (TS36.331 section 6.2.2 page 117 of reference [11])

```
-- ASN1START
    Master Information Block ::= SEQUENCE {
    dl-Bandwidth ENUMERATED {
    n6, n15, n25, n50, n75, n100},
    phich-Config PHICH-Config,
    system Frame Number BIT STRING (SIZE (8)),
    dl-Bandwidth-Re-11 ENUMERATED {
    n6, n15, n25, n50, n75, n100},
    spare BIT STRING (SIZE (6))
    }
-- ASN1STOP
```

Modification of SIB-1 (TS36.331 section 6.2.2 page 139 [11])

```
-- ASN1START
    SystemInformationBlockType1 ::= SEQUENCE {
    cellAccessRelatedInfo SEQUENCE {
    plmn-IdentityList PLMN-IdentityList,
    trackingAreaCode TrackingAreaCode,
    cellIdentity CellIdentity,
    cellBarred ENUMERATED {barred, notBarred},
    intraFreqReselection ENUMERATED {allowed, notAllowed},
    csg-Indication BOOLEAN,
    csg-Identity CSG-Identity OPTIONAL -- Need OR
    },
    cellSelectionInfo SEQUENCE {
    q-RxLevMin Q-RxLevMin,
    q-RxLevMinOffset INTEGER (1..8) OPTIONAL -- Need OP
    },
    p-Max P-Max OPTIONAL, -- Need OP
    freqBandIndicator INTEGER (1..64),
    schedulingInfoList SchedulingInfoList,
    tdd-Config TDD-Config OPTIONAL, -- Cond TDD
    si-WindowLength ENUMERATED {
    ms1, ms2, ms5, ms10, ms15, ms20,
    ms40},
    systemInfoValueTag INTEGER (0..31),
    nonCriticalExtension SystemInformationBlockType1-v890-IEs OPTIONAL
    }
    SystemInformationBlockType1-v890-IEs::= SEQUENCE {
```

-continued

```
lateNonCriticalExtension OCTET STRING OPTIONAL, -- Need OP
nonCriticalExtension SystemInformationBlockType1-v920-IEs
OPTIONAL
}
SystemInformationBlockType1-v920-IEs ::= SEQUENCE {
ims-EmergencySupport-r9 ENUMERATED {true} OPTIONAL, --
Need OR
cellSelectionInfo-v920 CellSelectionInfo-v920 OPTIONAL, -- Cond
RSRQ
nonCriticalExtension SEQUENCE { } OPTIONAL -- Need OP
}
PLMN-IdentityList ::= SEQUENCE (SIZE (1..6)) OF
PLMN-IdentityInfo
PLMN-IdentityInfo ::= SEQUENCE {
plmn-Identity PLMN-Identity,
cellReservedForOperatorUse ENUMERATED {reserved,
notReserved}
}
SchedulingInfoList ::= SEQUENCE (SIZE (1..maxSI-Message)) OF
SchedulingInfo
SchedulingInfo ::= SEQUENCE {
si-Periodicity ENUMERATED {
rf8, rf16, rf32, rf64, rf128, rf256, rf512},
sib-MappingInfo SIB-MappingInfo
}
SIB-MappingInfo ::= SEQUENCE (SIZE (0..maxSIB-1)) OF
SIB-Type
SIB-Type ::= ENUMERATED {
sibType3, sibType4, sibType5, sibType6,
sibType7, sibType8, sibType9, sibType10,
sibType11, sibType12-v920, sibType13-v920, spare5,
spare4, spare3, spare2, spare1, ...}
CellSelectionInfo-v920 ::= SEQUENCE {
q-QualMin-r9 Q-QualMin-r9,
q-QualMinOffset-r9 INTEGER (1..8) OPTIONAL -- Need OP
}
dl-Bandwidth-Re-11 ENUMERATED {
n6, n15, n25, n50, n75, n100},
-- ASN1STOP
```

Figure 10:
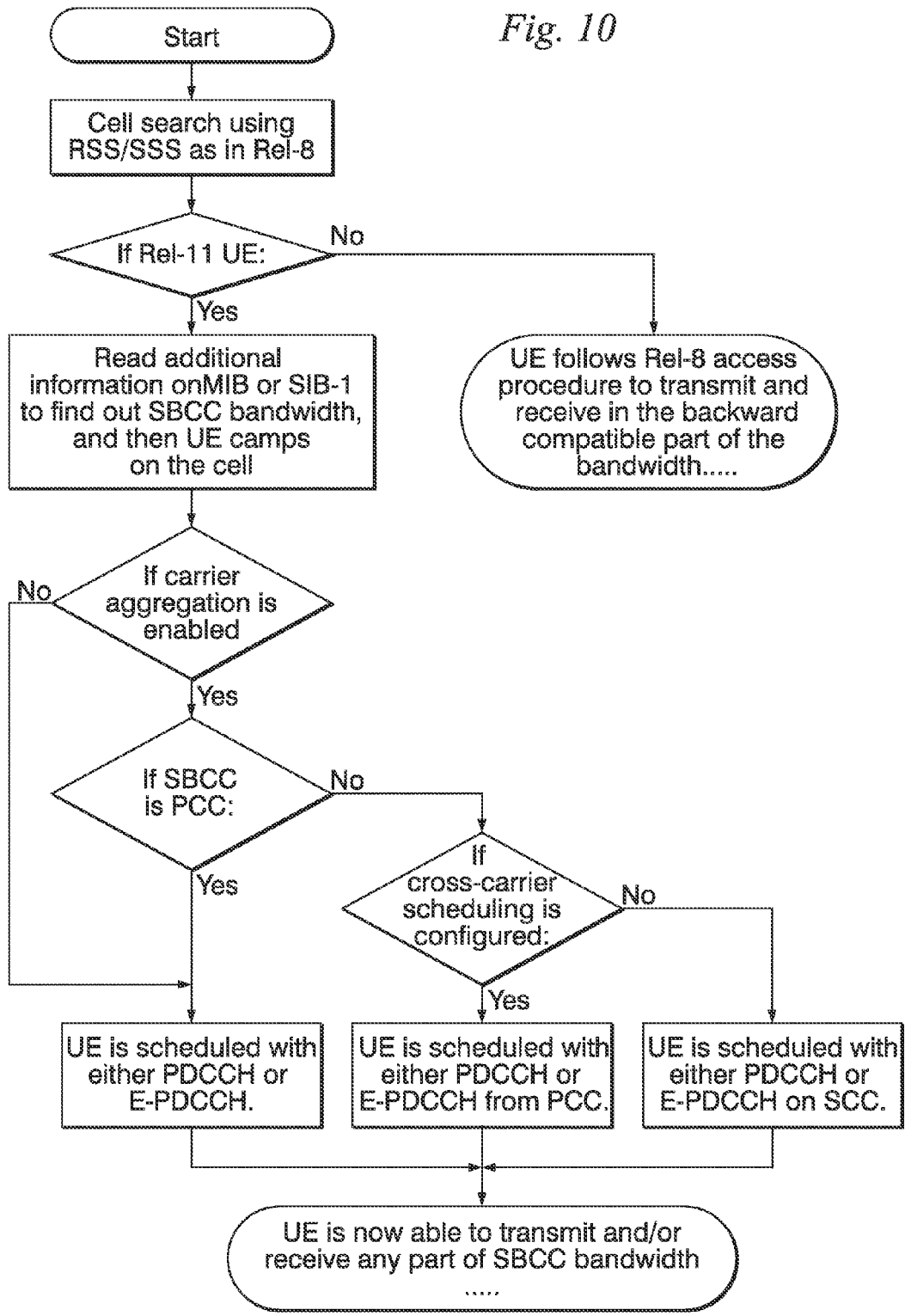
FIG. 10 is a flowchart showing UE procedures with the "Semi-backward compatible carrier".

The overall signaling mechanism to support SBCC is simple. FIG. 10 illustrates the UE procedures with SBCC and is described as follow:

Via MIB/SIB-1 and higher layer signaling, a SBCC capable UE shall be able to identify if
  i. SBCC feature is enable and the associated SBCC bandwidth
  ii. It is allowed to use this SBCC feature
  iii. Carrier Aggregation is available
  iv. Cross carrier scheduling is enable for SBCC If the CA is not available and SBCC feature is enabling, the SBCC capable UE shall be able to decode the PDCCH or E-PDCCH intended for it. This detected PDCCH or E-PDCCH shall carry control information for the reception and decoding of the PDSCH in the carrier segmentation region. This is illustrated in FIG. 7.

If the CA is available, Cross carrier scheduling is enable, and SBCC feature is enable, the SBCC capable UE shall be able to decode the PDCCH or E-PDCCH intended for it on the PCC. This detected PDCCH or E-PDC CH shall carry control information for the reception and decoding of the PDSCH in the carrier segmentation region of the PCC or SCC. Additionally, the SCC can also provide PDCCH for the PDSCH reception in its own carrier segmentation region which is not in control of the PCC. This is illustrated in FIG. 8.

As being demonstrated above, the embodiments of the present invention include

1. The idea of framework for partitioning the bandwidth of the LTE system for flexible operation of Rel-8/9/10 UE (backward compatible) with Rel-11 UE (non-backward compatible) for which control channel and reference signal mappings are optimized for interference coordination and management and overhead reduction is novel.

2. The idea of framework which simplifies standardization impacts and implementation complexity to introduce additional carrier types and bandwidth to LTE in a backward compatible manner.

3. The idea of signaling mechanism to notify Rel-11 and later UEs bandwidth in Rel-11 network, while supporting the Rel-8/9/10 UE in Rel-11 and later network.

Along with this, regardless of LTE system bandwidths are exemplarily discussed, the embodiments of the invention provide a novel way to expand for adopting any LTE system bandwidth in the later release LTE to support legacy UE operation with minimal standardization impacts and implementation complexity are also appreciated.

The invention provides framework and the associated signaling mechanism to define additional carrier type, known as "carrier segments", which is non-backward compatible carrier. This framework, called "semi-backward compatible carrier (SBCC)" enables to introduce carrier segments for Rel-11 in a smooth fashion, considering standardization impacts, implementation aspects and operator's deployment scenarios and spectrum usage.

The invention provides the following advantages:

1. Provides simple framework to standardize additional carrier type for Rel-11 LTE onwards for flexible and efficient spectrum usage Standardization impacts are minimum for considering Rel-8/9/10 LTE bandwidths for SBCC in the first phase, and possible in Rel-11 time period.

New bandwidths for SBCC could be added in the second phase, based on operator demands.

Implementation impacts are minimum for considering Rel-8/9/10 LTE bandwidths for SBCC.

Flexibility for deployment with backward compatible manner.

2. Provides simple mechanism to define new bandwidth for LTE in a backward compatible manner.

Due to scarce spectrum allocations, the Rel-8/9/10 LTE bandwidths (1.4, 3, 5, 10, 15 and 20 MHz) may not be sufficient in future and to avoid spectrum wastage.

It is also advantage to use larger bandwidth in compared to aggregating two carrier components, considering implementation, and overhead in carrier aggregation.

3. Provides smooth migration path and mechanism to reduce cell specific control signal and reference signal transmission overhead for LTE in a backward compatible manner.

Enable smooth moving from cell specific transmission in Rel-8/9/10 to UE specific transmission in Rel-11 on wards.

Enable Energy saving opportunity by eliminating unnecessary transmission of cell specific control and reference signal.

4. Provides better frequency domain interference coordination and management for the resources in the carrier segment regions.

Enhances throughput performance in heterogeneous network deployment scenarios.

Enables to use large bias for cell range expansion (CRE) in heterogeneous network deployment scenarios.

Enhance cell edge performance (throughput and coverage) in homogeneous network deployment scenarios due to interference coordination and less CRS pollution.

5. Provides simple signaling mechanism to notify SBCC bandwidth to Rel-11 and later release UEs.

6. Provides simple signaling mechanism for resources allocations in the non-backward compatible part of SBCC bandwidth.

Priority is claimed on Japanese Patent Application No. 2011-211585, filed Sep. 27, 2011, the content of which is incorporated herein by reference.

The invention claimed is:

1. A method implemented in a base station used in a wireless communications system, comprising:
    transmitting a carrier segment to a user equipment,
    wherein the carrier segment comprises:
        a first band having a first bandwidth; and
        a second band having a second bandwidth,
            wherein a first segment gap is disposed in a frequency domain between the first band and the second band, and the second bandwidth contains only UE specific control and UE specific data channel.

2. The method as claimed in claim 1, wherein the carrier segment further comprises:
    a third band having a third bandwidth,
    wherein a second segment gap is disposed in the frequency domain between the first band and the third band.

3. The method as claimed in claim 2, wherein the third bandwidth is equal to the second bandwidth.

4. The method as claimed in claim 1, wherein the first bandwidth is greater than 1.4 MHz.

5. The method as claimed in claim 1, wherein the first bandwidth is either one of 1.4, 3, 5, 10, 15, or 20 MHz.

6. The method as claimed in claim in claim 1, wherein the second band includes one or more UE-specific channels.

7. The method as claimed in claim 1, wherein the first band includes a physical downlink common control channel (PDCCH).

8. The method as claimed in claim 7, wherein the PDCCH comprises an enhanced physical downlink common control channel (EPDCCH).

9. The method as claimed in claim 1, wherein the carrier segment is used as a component carrier for carrier aggregation.

10. The method as claimed in claim 9, wherein the component carrier is a primary carrier.

11. The method as claimed in claim 9, wherein the component carrier is a secondary carrier.

12. The method as claimed in claim 1, wherein the first band includes a cell-specific reference signal (CRS).

13. The method as claimed in claim 1, wherein a signaling message for the carrier segment comprises:
    at least one of a master information block and a system information block; and
    additional signaling information for the carrier segment.

14. The method as claimed in claim 13, wherein the additional signaling information is equal to or less than 4 bits.

15. A method implemented in a user equipment used in a wireless communications system, comprising:
    receiving a carrier segment from a base station,
    wherein the carrier segment comprises:
        a first band having a first bandwidth; and
        a second band having a second bandwidth,
            wherein a first segment gap is disposed in a frequency domain between the first band and the second band, and the second bandwidth contains only UE specific control and UE specific data channel.

16. A wireless communications system, comprising:
    transmitting a carrier segment from a base station to a user equipment,
    wherein the carrier segment comprises:
        a first band having a first bandwidth; and
        a second band having a second bandwidth,
            wherein a first segment gap is disposed in a frequency domain between the first band and the second band, and the second bandwidth contains only UE specific control and UE specific data channel.

* * * * *